Jan. 17, 1956

G. A. PAGE 2,731,146

EGG GRADING MECHANISM

Filed June 26, 1950

*INVENTOR.*
GEORGE A. PAGE

BY *Whittemore Hulbert + Belknap*

ATTORNEYS

Jan. 17, 1956 G. A. PAGE 2,731,146
EGG GRADING MECHANISM
Filed June 20, 1950 6 Sheets-Sheet 3
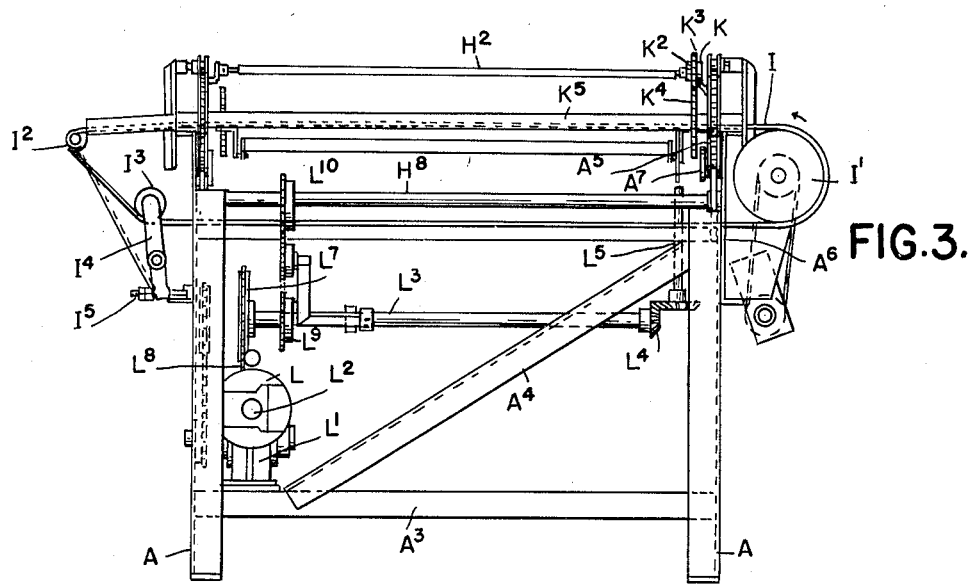
FIG.3.
FIG.4.
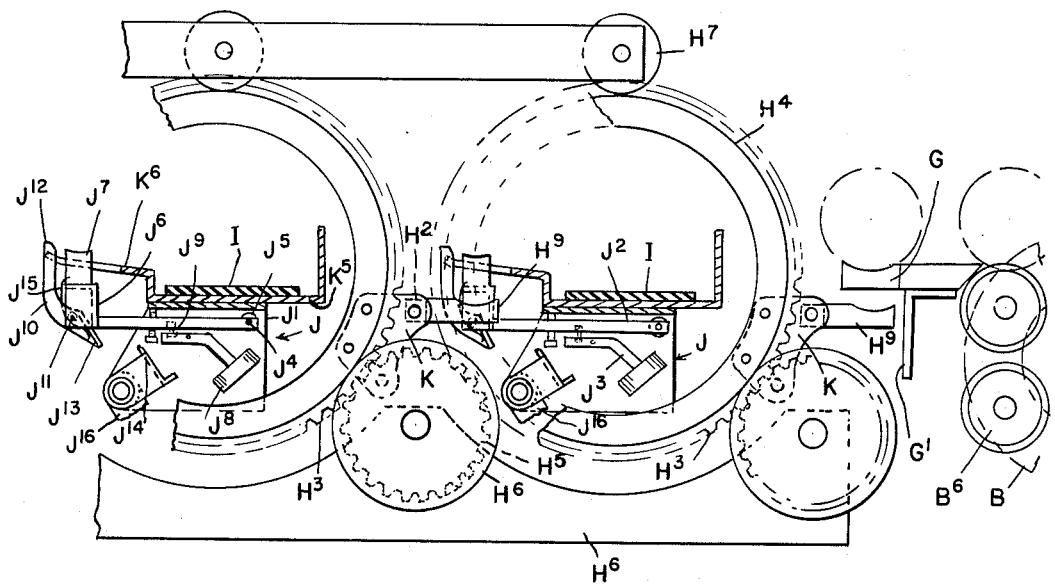
*INVENTOR.*
GEORGE A. PAGE
BY
Whittemore Hulbert & Belknap
ATTORNEYS Jan. 17, 1956 G. A. PAGE 2,731,146
EGG GRADING MECHANISM
Filed June 26, 1950 6 Sheets-Sheet 4

INVENTOR.
GEORGE A. PAGE
BY
*Whittemore Hulbert & Belknap*
ATTORNEYS

Jan. 17, 1956 G. A. PAGE 2,731,146
EGG GRADING MECHANISM
Filed June 26, 1950 6 Sheets-Sheet 5

INVENTOR.
GEORGE A. PAGE
BY
*Whittemore Hulbert & Belknap*
ATTORNEYS

Jan. 17, 1956 G. A. PAGE 2,731,146
EGG GRADING MECHANISM
Filed June 26, 1950 6 Sheets-Sheet 6
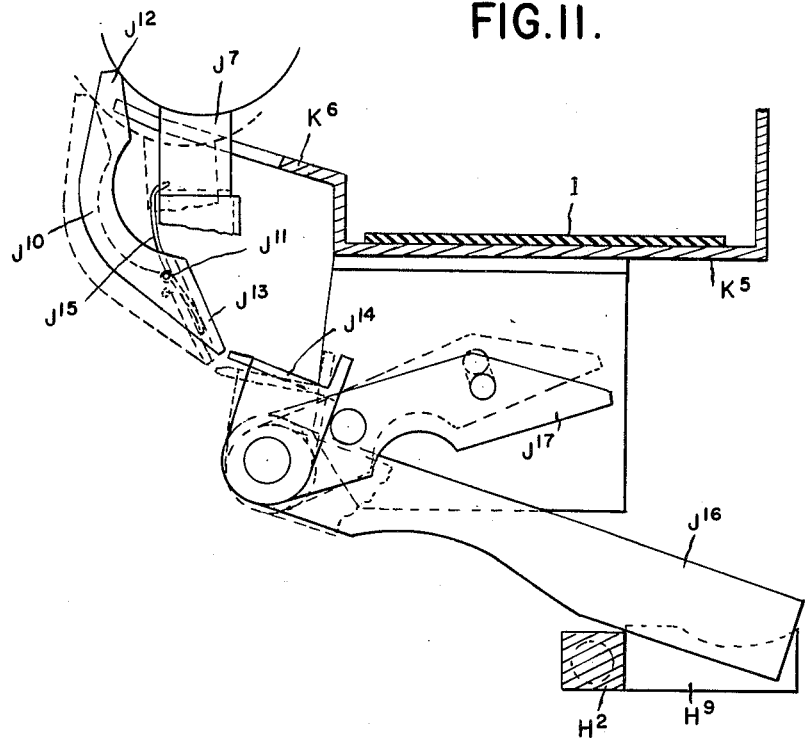
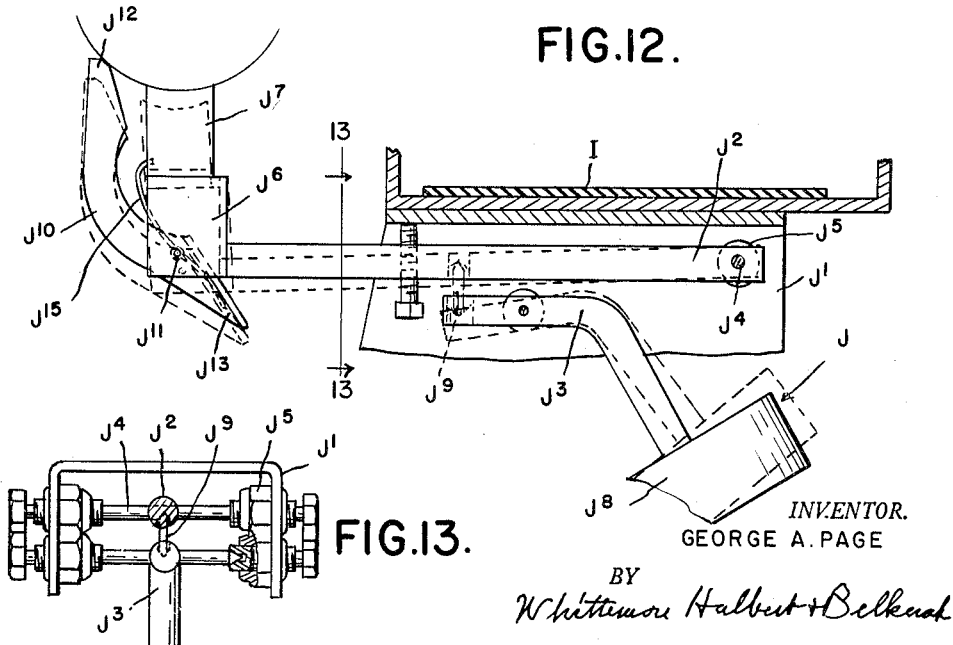
INVENTOR.
GEORGE A. PAGE
BY
Whittemore Halbert + Belknap
ATTORNEYS United States Patent Office 2,731,146
Patented Jan. 17, 1956

2,731,146
EGG GRADING MECHANISM
George A. Page, Detroit, Mich.

Application June 26, 1950, Serial No. 170,387

8 Claims. (Cl. 209—121)

The invention relates to means for grading articles and separating the same into a plurality of classes, the members of each class being within predetermined maximum and minimum limits of weight and size. More particularly the invention relates to means for grading eggs.

It is the object of the invention to obtain a simple construction of automatic mechanism which will perform the grading operations expeditiously without injury to the eggs or other articles being handled.

To this end the invention consists first in a continuously operating mechanism for advancing the articles to and from the grading means, and which effects the grading without interruption of such advancement.

The invention further consists in a grading means which, while continuous in its operation, provides an interval of time between successive arrivals of articles at the weighing and distributing point.

The invention further consists in a construction of grader including means for successively picking up and depositing the articles on the weighing means and which operates at variable velocity during each cycle with the minimum velocity at the points of pick up and deposit.

The invention further consists in a construction of grader in which the articles deposited on the weighing means, if of sufficient weight to actuate the same, will be transferred to a conveyor at substantially the same level by which they are removed to their particular class.

The invention further consists in a construction of grader in which the weighing means and associated conveyor are located within the orbit of the pick up and depositing means so as to avoid any interference therewith.

The invention further consists in the construction of mechanism in which all movements are accomplished without the requirement of cams.

Still further the invention consists in the various features of construction as hereinafter set forth.

While the mechanism can be used for the grading of any articles, I shall specifically illustrate and describe a construction designed for the grading of eggs.

In the drawings:

Fig. 3 is an end elevation;

Fig. 4 is a longitudinal section substantially on line 4—4, Fig. 1, showing two of the rotary members of the grading mechanism and the weighing balances and cross conveyors associated therewith;

Fig. 11 is an elevation of a modified construction illustrating means for changing the point of division between grades with the adjustment of the weighing balances;

Fig. 12 is an enlarged side elevation of one of the weighing balances;

Fig. 13 is a cross section on line 13—13, Fig. 12;

Fig. 14 is a plan view illustrating the picking up of an egg by the bar $H^2$ of a succeeding rotary grader from the weighing balance of a preceding grader.

Figure 1:
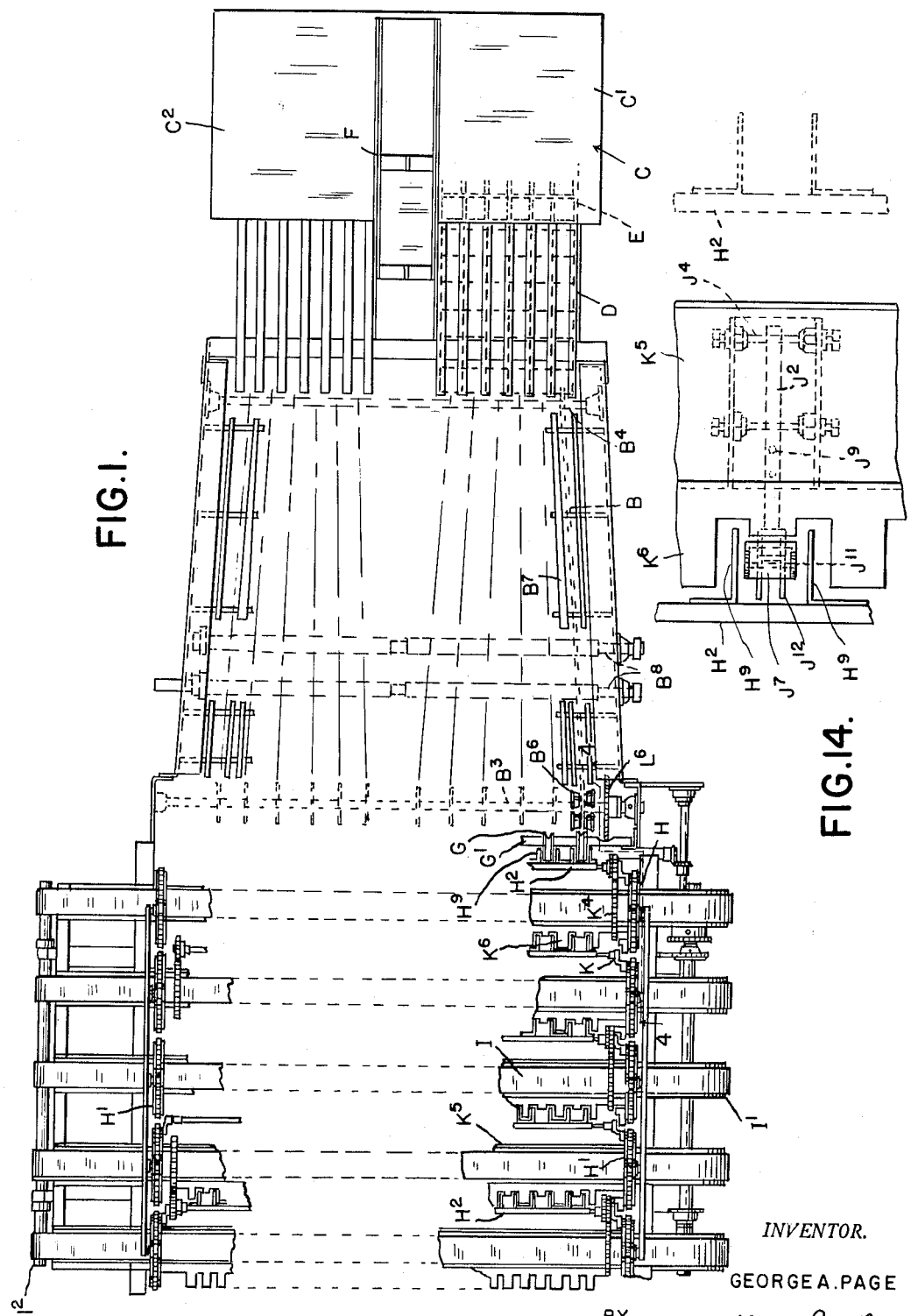
Fig. 1 is a plan view of the grading machine.
Figure 2:
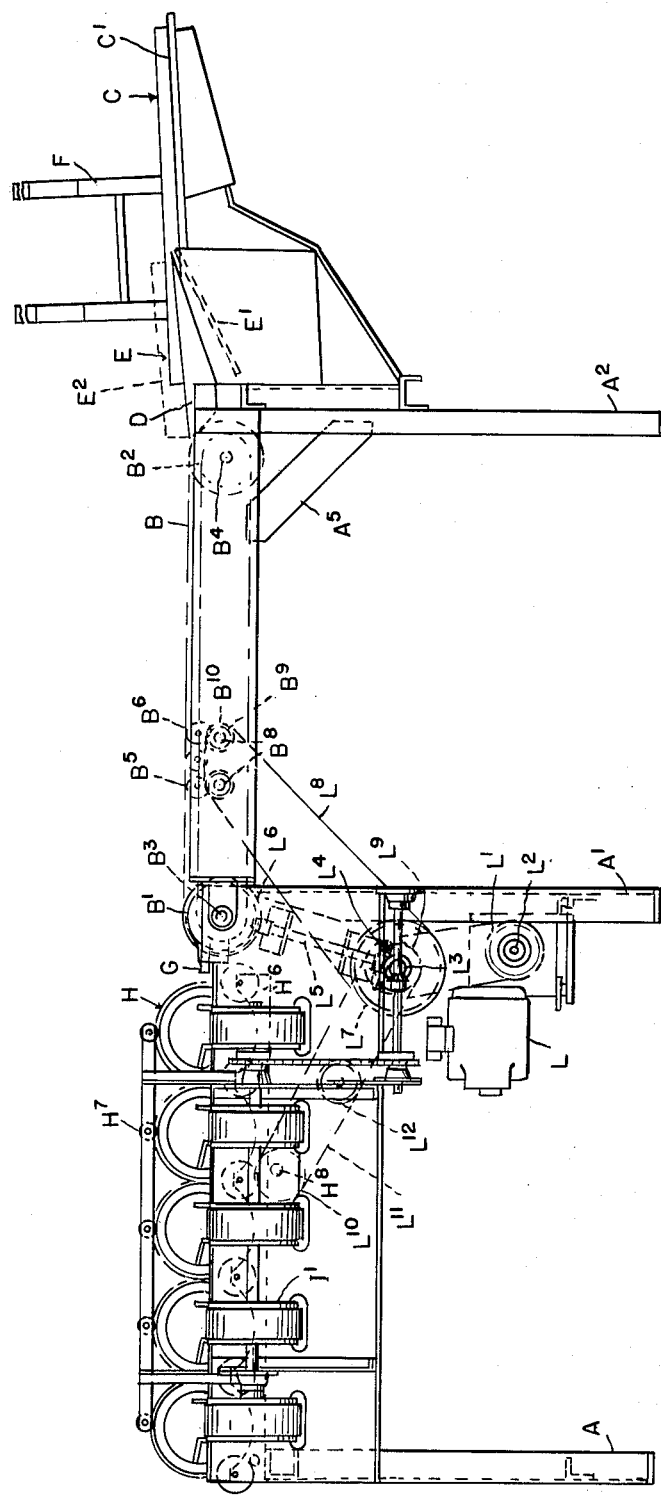
Fig. 2 is a side elevation thereof.
Figure 15:
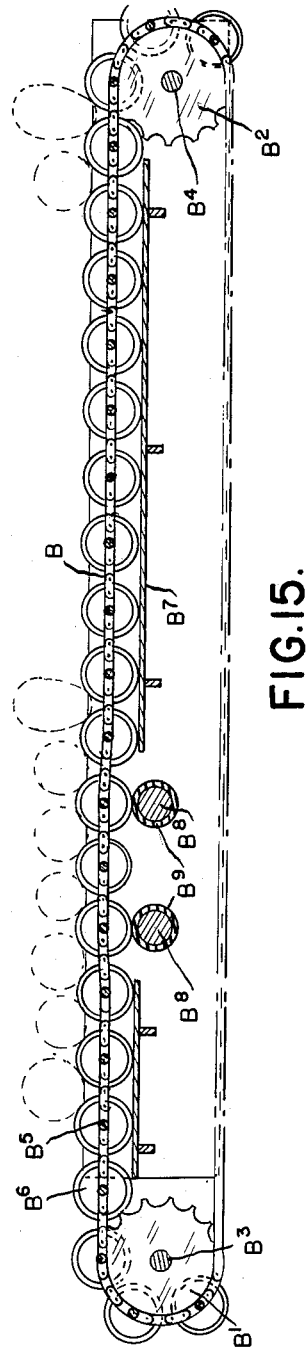
Fig. 15 is a longitudinal sectional elevation of one of the conveyors for advancing eggs to the first grader.
Figure 5:
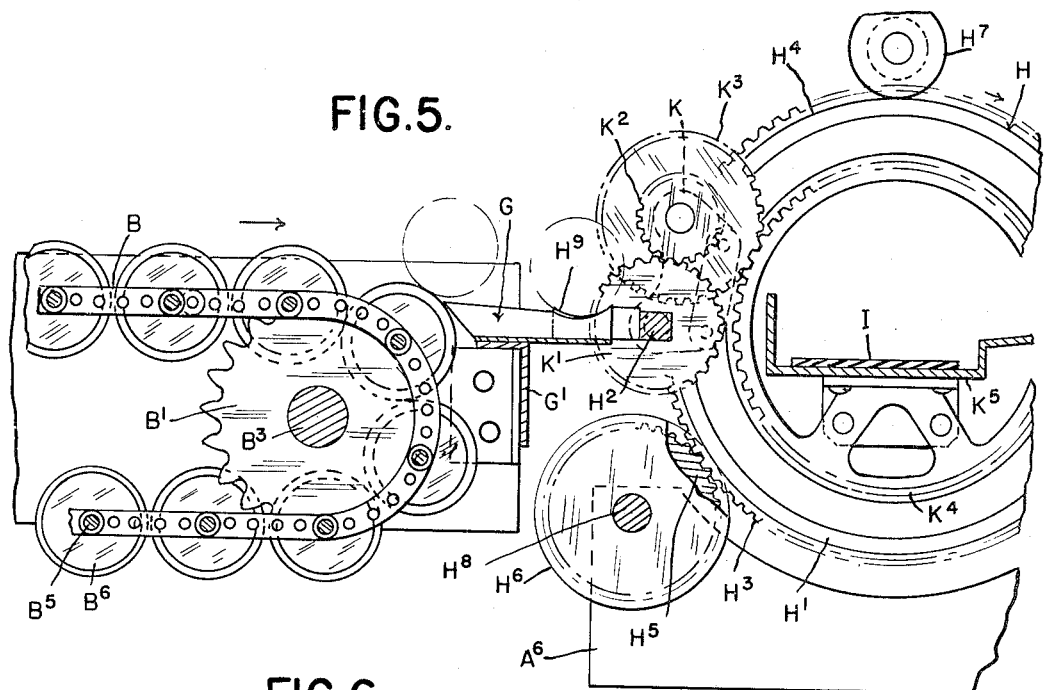
Fig. 5 is a sectional elevation substantially on line 5—5, Fig. 6.
Figure 6:
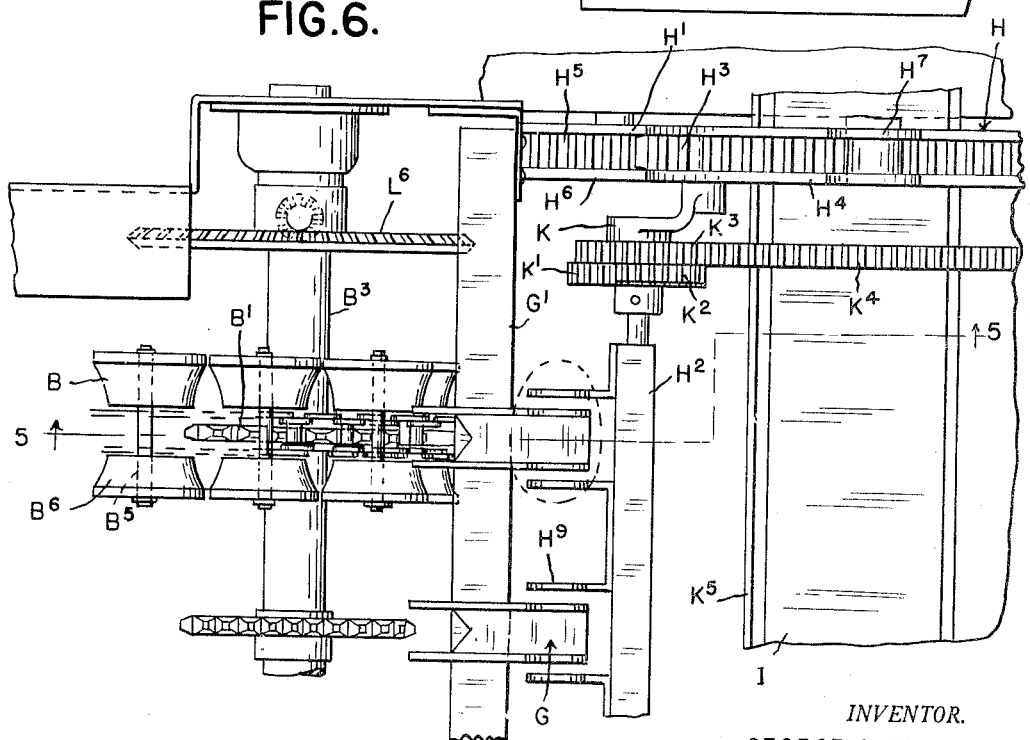
Fig. 6 is a plan view of the portion illustrated in Fig. 5.

Ungraded eggs are usually shipped from the farms in cellular cartons, and as used within the United States a standard size of carton is one holding three dozen eggs placed in six rows of six cells each. The cartons are formed of cardboard strips slitted to be placed into cross engagement with each other thus forming the rows of cells and capable when not in use of being collapsed with all the strips adjacent to each other. Each carton is also provided with a bottom which also is preferably formed of paper board and is pressed to provide a cushioned seat in each cell for the egg contained therein. Such seat may be formed by an upwardly embossed annular portion and a downwardly embossed central portion, which latter receives the egg.

My improved grading machine is adapted to simultaneously receive eggs from one or from a plurality of cartons, such as above described, in which the ungraded eggs may be first placed for transportation and which subsequently are used for receiving the graded eggs. The machine comprises a suitable frame having a plurality of pairs of supporting legs A, A', $A^2$, cross members $A^3$ and diagonal brace members $A^4$ and $A^5$ for holding the frame rectangular. Between the pairs of legs A and A' the frame supports the grading mechanism, while between the legs A' and $A^2$ there is supported a series of conveyors B for advancing the eggs deposited thereon. Beyond the legs $A^2$ is a slightly inclined table or shelf C on which the cartons containing the ungraded eggs are first deposited, and over which they are manually advanced to carry the eggs over the conveyors B at which point the cartons are removed. As specifically illustrated the shelf C is formed of two laterally spaced portions C', $C^2$, each of an area to receive a single carton but if desired additional portions for other cartons may be provided. The shelf portions C', $C^2$ are longitudinally spaced from the conveyors B and between these members are parallel strips or rails D, preferably formed of wood, which are spaced from each other to register with the centers of the carton cells in parallel rows. These strips at their ends adjacent to the shelves are slightly raised above the latter to form therebetween a space through which the bottom member E' of the cartons E can pass, while the top members $E^2$ are advanced over said strips. Thus each strip will support all of the eggs of its corresponding row of cells after the bottom member E' is removed. The conveyors B are preferably formed of endless chains travelling around sprockets B' and $B^2$ mounted on shafts $B^3$ and $B^4$. Each chain has secured to links thereof, in suitably spaced relation, shafts $B^5$ extending transversely on opposite sides of the chain. On these shafts are mounted rollers $B^6$ which are tapered from their outer ends inward and together form a substantially hour-glass shaped structure. The rollers on successive shafts extend into peripheral proximity to each other so as to form therebetween an egg-receiving space. Thus the whole chain will form a carrier for a series of eggs which are spaced from each other the same as the spacing of the cells of the carton, and are therefore adapted to receive eggs from a carton if advanced thereover. The arrangement as thus far described is such that the cartons E first deposited on the shelf portions C' or $C^2$ are manually advanced with their cellular portions passing over the strips D and their bottom portions passing beneath said strips, carrying the eggs forward over the conveyors B. Here they engage the spaces between adjacent rollers $B^6$ after which the upper portion $E^2$ of the carton is disengaged while the eggs continue to advance on the conveyors. The removed cellular portions of the cartons can then be collapsed and placed in a rack or holder F, which is between the table sections C′ and C².

The conveyors B in their portions engaging the sprockets B² are spaced the same as the spacing of the strips D and the cells of the carton. However, the portions of these conveyors that engage the sprockets B′ are more widely spaced and between these two points the chains travel through divergent paths. The purpose of this is to provide space between adjacent conveyors B sufficient to receive the eggs with their major axes extending horizontally, whereas the eggs first deposited are arranged with their major axes vertical. The rollers B⁶ of each conveyor travel over and in contact with rails B⁷ beneath the same, which causes them to revolve and this assists in turning the eggs from vertical to horizontal position. Further assistance is provided by passing the rollers at one point over a pair of shafts B⁸ which are revolved by means later described and which have friction surfaces formed by rubber sleeves B⁹ thereon. They are also arranged to lift the rollers B⁶ when passing thereover, so that the said rollers will be revolved at higher speed further assisting in arranging the eggs supported thereby in horizontal position. At the forward end of the conveyors and just beyond the sprockets B² are egg holders G. These are formed of pairs of spaced fingers mounted upon a stationary bar G′ with the upper surfaces of said fingers fashioned to first incline slightly downward in a forward direction and then to round upward to form a receiving socket for the egg.

Grading mechanism

Generally described the grading mechanism includes a series of parallelly arranged, rotary members H adjacent to each other. Each member H comprises a pair of annular members H′ at opposite ends thereof and a connecting bar H² extending therebetween which travels through an annular orbit. Within this orbit there is arranged a transversely travelling conveyor I, which also passes through the annular end members. Adjacent to the conveyor I, and also within the orbit, is a series of weighing balances J spaced from each other by a dimension corresponding to the spacing between the eggs on the holders G. The bar H² carries a series of pick up members for lifting the eggs off from the holders G and depositing them upon the respective weighing balances after a half cycle of movement of said bar. The remainder of the cycle returns the bar to pick up a succeeding series of eggs which have in the meantime been deposited on the holders G. As all the rotary members H are timed alike, the pick up on the second member of the series will remove the egg deposited on the weighing member of the first of the series if it has not otherwise been removed, and will carry it on to the weighing means of the second of the series. A similar operation will be carried out by the third of the series and so on to the end member. Each weighing balance is adapted to be depressed by the weight of the egg deposited thereon, and if the weight is above a predetermined limit the depression will be sufficient to cause the operation of a knock off member which transfers the egg to the conveyor. Any egg which is less in weight than this limit will remain on the balance until it is removed by the pick up means of the next succeeding rotary member as above described. Thus by setting the weighing balances of the successive rotary members to be actuated only when the eggs are within predetermined limits of weight, the grading of all will be effected and those of each class will be transferred to the corresponding conveyor I.

Specific construction of grading means

The more specific construction of the apparatus generally described above is as follows. The rotary members H have, as before described, annular end members H′ connected by a bar H². Each of the annular members H′ has gear teeth H³ in the central portion of the periphery thereof and plane annular shoulders H⁴ on opposite sides. The members H′ are supported by smaller gear members H⁵ which are revolubly mounted on the frame. As shown the gears H⁵ are between an outer horizontal beam or side rail A⁶ and an inner member A⁷, and each gear has spaced flanges H⁶ which embrace the gear portions H³ of the members H′ to hold the latter in the same plane. There are also plane rollers H⁷ engaging each of the members H′ at the top thereof being provided with similarly spaced flanges for embracing the gear portion and contacting with the annular shoulders H⁴. The construction is the same at the opposite ends of the rotary members A, A′, etc., so that all of these members will rotate simultaneously in the same direction. One of the small gears H⁵ of the series at the front constitutes a drive gear for said series and is connected by a shaft H⁸ with a corresponding gear of the series at the rear to drive this also. The shaft H⁸ is driven at variable speed during each cycle by mechanism that will be later described.

It has been stated generally that the bar H² has mounted thereon a series of pick up members for carrying the eggs from the holders G to the corresponding weighing balances. Such pick up members are preferably formed as pairs of fingers H⁹, which are mounted upon the bar H² to extend laterally therefrom and to embrace the fingers of the egg holders G when in registration therewith, so as to lift the eggs off therefrom. Inasmuch, however, as the members H rotate through substantially a half cycle in passing from the egg holders to the weighing balances, it is necessary to provide means for holding these pick up fingers so as to extend horizontally in all positions in their orbital movement. This, as shown, is accomplished by rotating the bar H² in a reverse direction to the rotation of the members H′ on which it is mounted and by means of a gear train and stationary annular rack. The mounting for the bar H² is formed by brackets K on the members H′ in which the opposite ends of the bar are pivoted. The gear train includes a gear K′ mounted on the bar at one end thereof, which is in mesh with a gear K² mounted on the bracket and having a coaxial pinion K³ secured thereto, which is in mesh with an annular stationary rack K⁴. The ratios of these gears, pinion and rack are such that the annular movement due to rotation of the members H′ is canceled in the bar H², which therefore moves through its orbit without any rotation about its own axis. The annular racks K⁴ are mounted on a frame member K⁵, which is secured to and extends between the side rails A⁶ passing through both of the members H′. This member K⁵ is of a channel shaped cross section, its bottom portion forming a support for a belt conveyor I. The rack K⁴ (which may be formed of a gear wheel with a portion of its center cut away) is secured to the under side of the member K⁵ and surrounds it being in axial alignment with the members H′. Thus the egg lifting fingers H⁹ on the bar H² project outside of the orbit of said bar when in registration with the fingers on the egg holders G and project inside of its orbit to deposit the eggs on the weighing balances, which latter are also located within the orbit and are of the following construction.

Weighing balance

J′ is an inverted channel member secured to the under side of the member K⁵ and having parallel depending flanges. J² and J³ are lever members fulcrumed within the channel member J′ by cross shafts J⁴ with conical ends engaging bearings J⁵ on the flanges of the member J′. The lever J² has mounted on its outer end a member J⁶, which has a pair of spaced upwardly extending flanges J⁷ concave at their upper edges and forming a support on which the egg is deposited by the fingers H⁹. The lever arm J³ has a portion on one side of its fulcrum which is downwardly inclined and on which a weight J⁸ is adjustably secured. On the opposite side of its fulcrum the lever J³ is normally substantially parallel to the lever J² and a link or strut member J⁹ having conical ends engages registering recesses in the levers $J^2$ and $J^3$ to form thereof a compound lever. There is also mounted on the member $J^6$ a lever member $J^{10}$, which is fulcrumed on a cross pin $J^{11}$ and has a portion $J^{12}$ extending upward to above the fingers $J^7$. A portion $J^{13}$ extends downward below the fulcrum, and, when the balance is sufficiently depressed by the weight of the egg supported thereon, this portion $J^{13}$ will be in the path of a rock bar $J^{14}$. The lever $J^{10}$ constitutes a knock off device which, when actuated by the rock bar $J^{14}$, will transfer the egg from the supporting fingers $J^7$ permitting it to roll down an inclined flange $K^6$ on the member $K^5$ and onto the belt conveyor I. A spring $J^{15}$ returns the lever $J^{10}$ and normally holds it out of interference with the egg when deposited on the fingers $J^7$. An arm $J^{16}$ attached to one end of the rock bar $J^{14}$ extends into the path of the orbital moving bar $H^2$ and is actuated thereby in a certain portion of its orbit to rock the bar $J^{14}$.

Conveyors for classified eggs

Each conveyor I is preferably formed by a belt which in its upper portion travels over the member $K^5$. At its forward end this belt passes around a driving pulley $I'$ and at its rear end passes around a small pulley $I^2$ to return beneath the channel $K^5$. A tightener pulley $I^3$ mounted on a lever $I^4$, fulcrumed on the rear portion of the frame and adjusted by a screw $I^5$, serves to hold the belt at proper tension.

Actuating mechanism

All of the mechanism above described is preferably actuated from an electric motor unit L mounted on the lower portion of the frame and having a step down transmission housed in a portion $L'$ of this unit. The driven shaft of this unit transmits its motion through a sprocket and chain connection $L^2$ to a shaft $L^3$. The latter shaft is connected by beveled gears $L^4$ with an upwardly extending shaft $L^5$, which at its upper end is connected by beveled gears $L^6$ with the shaft $B^3$ on which the conveyor sprockets $B'$ are mounted. A sprocket $L^7$ on the shaft $L^3$ operates a chain $L^8$ which engages sprockets $B^{10}$ on the shafts $B^8$ to rotate the same as previously described. The shaft $H^8$ is driven from the shaft $L^3$ (which latter rotates at constant velocity) by a transmission which imparts variable velocity to said shaft $H^8$ during each cycle. This transmission, as shown, is formed by eccentric sprockets $L^9$ and $L^{10}$ mounted, respectively, on the shafts $L^3$ and $H^8$. A chain $L^{11}$ connects these sprockets and there is also a tightener sprocket $L^{12}$ for maintaining constant tension on this chain. The construction is such as to impart to the shaft $H^8$ a substantially harmonic variable speed, which is at lowest velocity at the points in its cycle corresponding to the pick up and deposit of the eggs by the fingers $H^9$. This minimizes impacts without reducing the speed of operation in the whole cycle.

Operation

The complete operation of the machine in grading eggs will be understood from the above but to briefly recapitulate is as follows. Two cartons containing ungraded eggs are simultaneously placed upon the table portions $C'$ and $C^2$ and are manually advanced thereover, the cellular portions passing above the strips or rails D, while the bottom portions pass beneath said rails and accumulate in a compartment $F'$ therebeneath. Further advancement of the cellular portions of the carton brings the rows of cells, respectively, over the conveyors B into engagement with the rollers $B^6$ whereupon said cellular portion is lifted off, is collapsed and placed in engagement with the rack F. As there are six cells in each transverse row of each carton, there will be twelve longitudinal rows of eggs simultaneously in engagement with the conveyors B, which latter diverge slightly as they advance. This permits the changing of the major axes of the eggs from vertical to horizontal and the turning of the rollers $B^6$ by contact with the rails $B^7$, and the faster turning of these rollers when in contact with the shafts $B^8$ facilitates such change. The advance egg of each series is deposited on the corresponding holder G and the timing of advancement is such that each of the rotary members H will complete a cycle during the interval between deposits of successive eggs on the holders G in each series. The twelve eggs on the holder G will be simultaneously lifted by the fingers $H^9$ when moving upward at slow velocity and will be accelerated through the first quarter cycle and decelerated during the second quarter to be deposited, while moving downward at a slow velocity, on the fingers $J^7$ of the respective balances. Those of the eggs which are above a predetermined weight will depress their corresponding balances and through the operation of the knock off levers $J^{10}$ will be removed from the balance and will roll onto the conveyor I. On the other hand, those eggs which are less than the said predetermined weight will remain on the fingers $J^7$ until removed by the pick up fingers $H^9$ of the second rotary member H. They will then be deposited on the balances within said second rotary member and the operation will be repeated. All of the weighing balances are the same in construction but by adjusting the weights $J^8$ they may be set for each class. Finally the eggs transferred to the conveyor I will be moved thereby to the rear of the machine where they will be received by further advancement means (not shown).

Figure 7:
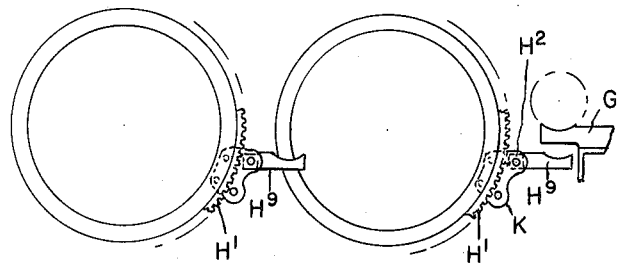
Figs. 7, 8, 9 and 10 are diagrammatic views illustrating successive steps in the grading operation.
Figure 8:
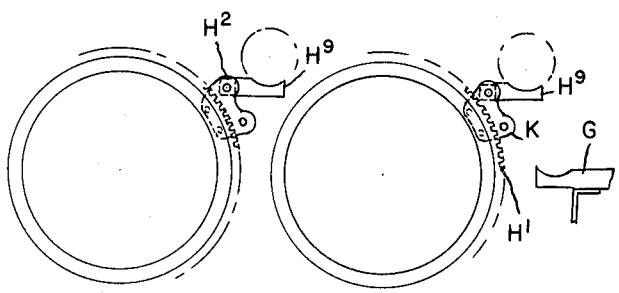
Figure 9:
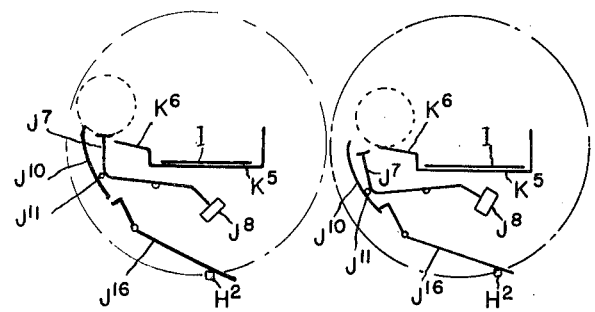
Figure 10:
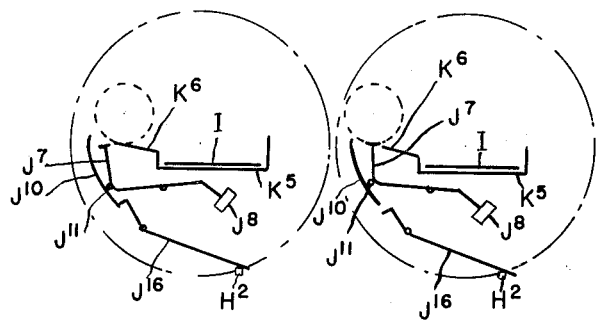

In the diagrammatic views, Figs. 7 to 10, inclusive, successive positions of the bars $H^2$ in their oribtal movements are shown. Fig. 7 shows the bar in a position where the fingers $H^9$ are about to pick up the eggs from the members G. Fig. 8 shows the eggs as being carried upward. Figs. 9 and 10 show the bars $H^2$ after the fingers $H^9$ have deposited the eggs on the weighing balances, said bars being in a position to operate the knock off levers if the balance has been depressed by the weight of the egg. In Fig. 9, the balance of the first of the grading members is shown depressed and the egg about to be knocked off by the lever $J^{10}$. The second of the graders shows the balance in its raised position inasmuch as the weight of the egg has been insufficient to depress it. In Fig. 10, the bars $H^2$ are in the same position but the balance in the first of the graders has not been depressed by the egg, while in the second of the graders the balance has been depressed and the egg is ready to be knocked off by the lever $J^{10}$. It will be understood that in each row of eggs simultaneously carried by a bar $H^2$ certain ones will be of sufficient weight to be transferred to the conveyor, while others will remain on the bar until picked up by the bar $H^2$ of the succeeding rotary member.

Means for adjusting grading means

The grading of eggs is prescribed by law and within the United States both Federal and State laws require division into five grades. In the highest grade the weight must be at least 30 oz. per dozen, the next lower grade is 27 oz., then 24 oz., 21 oz., and, finally, the lowest 18 oz. While it would be illegal to change the limits so as to place in any grade eggs less than the required weight, it is permissible to place in each grade eggs that weigh more than the prescribed limit. For commercial reasons it is desirable to make such changes in the limits at various times dependent upon the demand for eggs of any particular grade. For instance, if there is a demand for eggs in the 24 oz. limit which is greater than the supply. This demand may be filled by raising the limit of the next higher grade 27 oz. as, for instance, to 28 oz. This would place in the 24 oz. grade many additional eggs which would otherwise be included in the 27 oz. grade. This purpose is accomplished by the modified construction illustrated in Fig. 11. In this construction the rock bar $J^{14}$ is adjustable so that it can be lowered in its relation to the weighing balances and the knock off levers $J^{10}$ carried thereby. As indicated in full lines the rock bar is raised to its normal position where it will transfer eggs from the balances at the prescribed minimum limit. In dotted lines the rock bar has been depressed and, consequently, the weight of the eggs must be greater to bring knock levers $J^{10}$ into the path of the rock bar. The means for this adjustment is more or less diagrammatically illustrated in Fig. 11 as including levers $J^{17}$ located at front and rear of the frame in which the rock bars $J^{14}$ are pivotally mounted. As illustrated in full lines the levers $J^{17}$ are in normal position, but in dotted lines the position has been shifted to lower the rock bar so that the balance must be further depressed before the knock off lever $J^{10}$ will be actuated. In either of the positions of the adjustment, or in any intermediate position, the rock bar $J^{14}$ will be actuated by the bar $H^2$ and arm $J^{16}$ as previously described.

What I claim as my invention is:

1. A grading unit comprising a series of weighing devices arranged side by side each set to be depressed by an article thereon which is of more than a predetermined weight, a conveyor extending adjacent to each of said weighing devices to receive therefrom the articles of those depressed, a carrier member extending the length of said series and mounted for cyclic movement through a cylindrical orbit surrounding and clearing all of said weighing devices and said conveyor, a rotary annular member forming a mounting for said carrier member and through which said conveyor has clear passage, and individual transfer members mounted on said carrier member, each adapted to pick up an article from outside said orbit and deposit it on the corresponding weighing device within said orbit, and means for separately removing from said weighing devices and from within said orbit all articles remaining thereon which are less than said predetermined weight.

2. The construction as in claim 1 in which said conveyor is an endless belt having one portion thereof passing within and through said cylindrical orbit and a return portion outside of said orbit.

3. The construction is in claim 1 in which said transfer members project horizontally outside said arbit in the pick-up position thereof, and means for rotating each transfer member in a direction reverse to the orbital rotation of said carrier member to bring the former within said orbit in the deposit position thereof.

4. A grading machine comprising a plurality of grading units, each of the construction of claim 2 and in which the pick-up means of each succeeding unit constitutes the removing means of the preceding unit.

5. The construction as in claim 4 in which each unit has a second annular member, said annular members being at opposite ends of said carrier member and each having gear teeth and intermediate gears between and in mesh with the annular gears of adjacent units to rotate all simultaneously and at the same angular speed.

6. The construction as in claim 5 provided with a driving means for said units having a substantially harmonic variable speed in each cycle timed to have lowest velocity at the pick-up and deposit points of said transfer members.

7. The construction as in claim 1 in which each weighing device has an article kick-off lever carried thereby and depressed therewith, and a rockable member operated once in each cycle of said carrier member to actuate the kick-off levers of all depressed weighing devices but clearing all those not depressed.

8. The construction as in claim 7 in which said rockable member has an actuating arm extending into the path of said carrier member to be actuated thereby and at a point in its orbit beyond that at which the articles are deposited on said weighing devices.

References Cited in the file of this patent

UNITED STATES PATENTS

| | | |
|---|---|---|
| 1,484,259 | Fowle | Feb. 19, 1924 |
| 1,641,367 | Anderson | Sept. 6, 1927 |
| 2,246,597 | Niederer | June 24, 1941 |
| 2,347,068 | Sneed | Apr. 18, 1944 |
| 2,481,440 | Page | Sept. 6, 1949 |
| 2,488,230 | Page | Nov. 15, 1949 |
| 2,517,341 | Page | Aug. 1, 1950 |
| 2,531,292 | Page | Nov. 21, 1950 |

FOREIGN PATENTS

| | | |
|---|---|---|
| 446,203 | Great Britain | Apr. 27, 1936 |